United States Patent [19]

Eddens

[11] 4,350,913

[45] Sep. 21, 1982

[54] MAGNETIC PARTICLE DEVICES

[75] Inventor: Gerald R. Eddens, St. Louis County, Mo.

[73] Assignee: W. J. Industries, Incorporated, Fenton, Mo.

[21] Appl. No.: 178,075

[22] Filed: Aug. 13, 1980

[51] Int. Cl.[3] ............................................. H02K 49/00
[52] U.S. Cl. ..................................... 310/103; 192/21.5
[58] Field of Search .................... 310/92, 93, 103, 105, 310/268, 257, 254, 42; 192/21.5; 336/212

[56] References Cited

U.S. PATENT DOCUMENTS

| | | | |
|---|---|---|---|
| 2,905,293 | 9/1959 | Winther | 192/21.5 |
| 3,119,034 | 1/1964 | Luenberger | 310/93 X |
| 3,351,166 | 11/1967 | Potter et al. | 192/21.5 |
| 3,587,020 | 6/1971 | Wassner | 336/212 |
| 3,962,595 | 6/1976 | Eddens | 310/93 |
| 4,210,890 | 7/1980 | Olsen | 310/42 X |

*Primary Examiner*—Donovan F. Duggan
*Attorney, Agent, or Firm*—Charles B. Haverstock; Robert M. Garrett; Herbert B. Roberts

[57] ABSTRACT

A housing for magnetic particle devices comprising first and second housing members adopted to be assembled in side-by-side axial relation, at least one of said housing members having an annular cavity formed extending inwardly on one side thereof adjacent to the other housing member, an annular tapered surface formed on the side of one of said housing members at an intermediate location radially of the annular cavity and a sidewardly extending annular flange formed on the other housing member for engaging the annular tapered surface to divide the annular cavity into inner and outer cavity portions when the first and second housing members are connected, the annular flange separating the cavity into separate portions on opposite sides thereof, and members connecting the first and second housing members together whereby the annular flange moves axially against and is deformed by engagement with the annular tapered surface to seal between the separate cavity portions. The housing also includes a portion for supporting a rotatable member that extends into the inner cavity portion, the inner cavity portion also containing particles of a magnetizable material.

13 Claims, 6 Drawing Figures

MAGNETIC PARTICLE DEVICES

Magnetic particle devices have been known for some time and are used for many different purposes including purposes where it is necessary or desirable to be able to accurately control and/or adjust a coupling between two members such as in clutches or brakes. In magnetic particle devices the coupling is varied by varying the strength of a magnetic field between two spaced and relatively movable members. The space between the members contains particles of a magnetizable substance in a powder or powder like consistency and the particles can be used in dry form or can be in a liquid vehicle. The construction of the relatively movable members may be of a form somewhat like that shown in Eddens U.S. Pat. Nos. 3,962,595 and 4,085,344, assigned to Applicant's assignee. This invention differs from the patented devices in several important respects including relating primarily to magnetic particle devices of the rotor disc type although its principles have applications to other constructions as well.

Known magnetic particle devices have certain shortcomings and disadvantages which make them expensive and complicated and limit their usefulness and make them undesirable for many applications. This is especially true of the means used for sealing the chamber containing the magnetic particles and for reducing drag when no coupling or braking action is desired. The present device achieves these and other objects in a relatively simple, effective and novel way as will be explained.

In magnetic particle devices the magnetic field is supplied by an electrically excited coil, usually annular, positioned in a chamber so that its field extends in part through the surrounding housing structure, in part through the rotatable member, and in part through the space in which the magnetic particles are located including through the particles. This is also true of the present device wherein the coil is located in an outer chamber between housing portions and wherein the housing portions form a second inner chamber for accommodating a rotatable member or disc and the magnetizeable particles. In the present construction the chambers are sealably isolated from each other by means of an annular flange on one of the housing portions which is cammed outwardly by engagement with an annular tapered surface on the other housing portion when the housing portions are fastened together. In the past the separate housing chambers for the coil and the rotatable member have been separated by non-magnetic spacer means and other means which are structurally relatively complicated and costly and have had certain operational shortcomings. The known devices have been less than fully effective also because they are not able to quickly and effectively reduce the affects of residual flux when the magnetic field producing means is de-energized, and to some extent have suffered from a lack of durability due to their greater complexity of design and the relatively large number of parts required. Additionally, the seals employed in the known constructions, for the most part, have been made of non-magnetic materials which are less durable than the seals obtained by the present construction and are not generally reusable, and, as indicated, result in the production of some objectionable residual magnetism some of which passes through the rotatable portions even after the electrical coil is de-energized.

The present construction, on the other hand, provides an improved seal between adjacent chambers formed by connected housing portions in magnetic particle devices, and the improved seal is formed by mating portions on the housing members themselves, and therefore involve relatively few parts and a simpler and a cheaper construction. Another advantage of the present construction is that the seals formed by the connected housing portions are relatively insensitive to temperature and temperature changes and therefore do not leak when subject to changing temperatures and are also able to be opened and reclosed without loss of good sealing characteristics. The present seal construction also results in a rugged, efficient, durable and reusable construction. This, in large part, in because the seal of the present device in its preferred form is formed by an annular flange formed integrally with one of the housing members, which flange is cammed into sealing condition by an annular tapered shoulder on the other housing member to form the narrow saturable bridge which shorts out the magnetic flux produced by the residual magnetism remaining after the electrical coil is de-energized thereby reducing the drag on the rotary member which otherwise would be present.

Other prior art of general interest to show the state of the art are disclosed in U.S. Pat. Nos. 2,604,198; 2,685,947; 3,469,665; and 3,739,887.

It is a principal object of the present invention to provide an improved seal for separating the coil chamber from the chamber for the rotatable member in a magnetic particle device.

Another object is to provide annular sealing means for a magnetic particle device, which sealing means are cammed into a sealed condition when the device is assembled.

Another object is to provide sealing means that can be repeatedly opened and reclosed without losing their sealed condition.

Another object is to provide a more durable seal construction in magnetic particle devices.

Another object is to provide an improved, less complicated seal between the housing members of magnetic particle devices.

Another object is to improve the durability of magnetic particle devices.

Another object is to simplify the construction of magnetic particle devices.

Another object is to minimize the possibility for loss of, or undesirable displacement, of magnetic particles in magnetic particle devices.

Another object is to reduce the manufacturing, repair, and maintenance costs associated with magnetic particle devices.

Another object is to provide a seal between stator portions of magnetic particle devices, which seal is relatively insensitive to temperature and temperature changes.

Another object is to reduce drag on the rotatable portions of magnetic particle devices due to residual magnetism.

Another object is to provide an improved disc construction for magnetic particle devices.

Another object is to provide an axially extending magnetic coupling field for use in magnetic particle devices.

Another object is to improve the efficiency of magnetic particle devices.

Another object is to provide a disc rotor for use in magnetic particle devices, which rotor has spaced openings formed therein for holding magnetic particles.

These and other objects and advantages of the present invention will become apparent after considering the following detailed specification in conjunction with the accompanying drawings, wherein.

Figure 1:
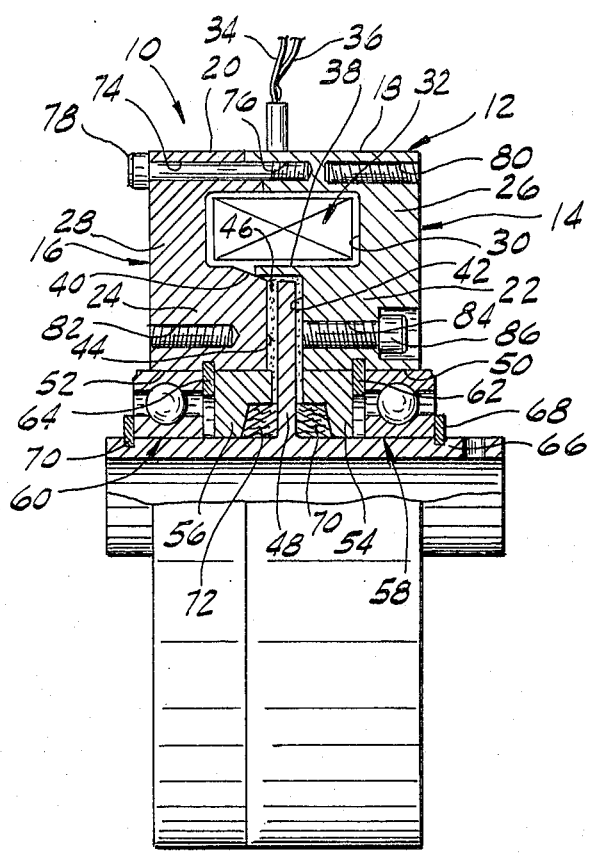
FIG. 1 is a side elevational view, partly in cross-section showing the details of a magnetic particle device constructed according to the present invention.
Figure 2:
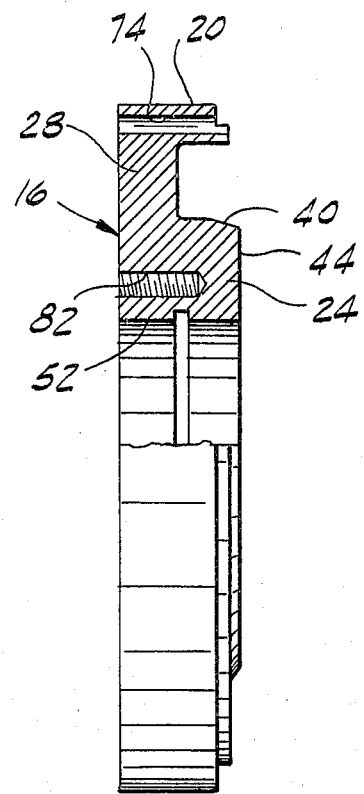
FIG. 2 is a cross-sectional view of the left stator housing portion shown in FIG. 1.
Figure 3:
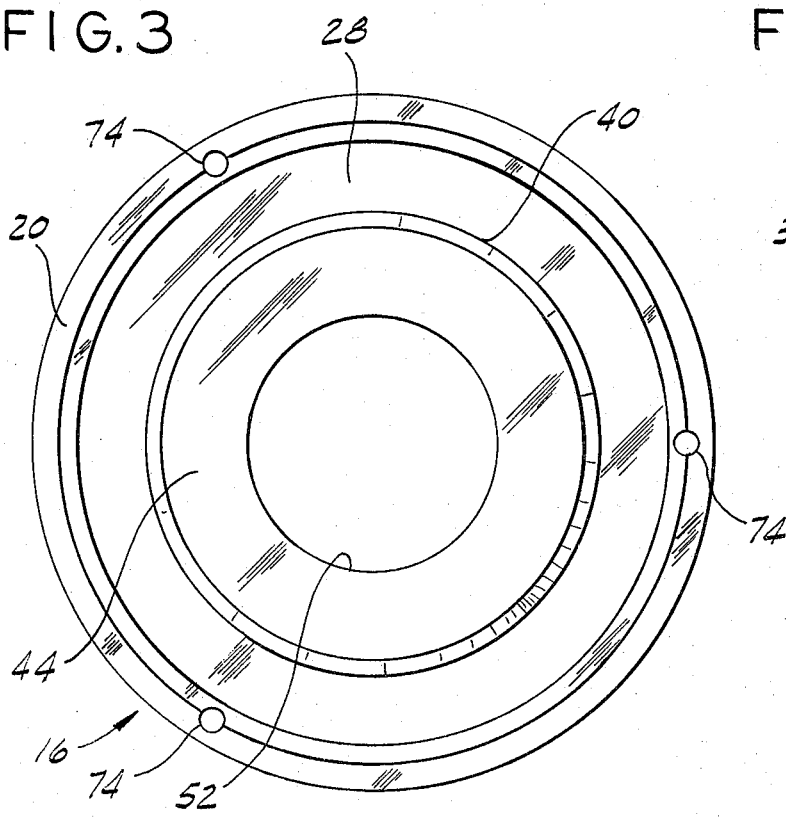
FIG. 3 is a right end view of the stator housing portion of FIG. 2.
Figure 4:
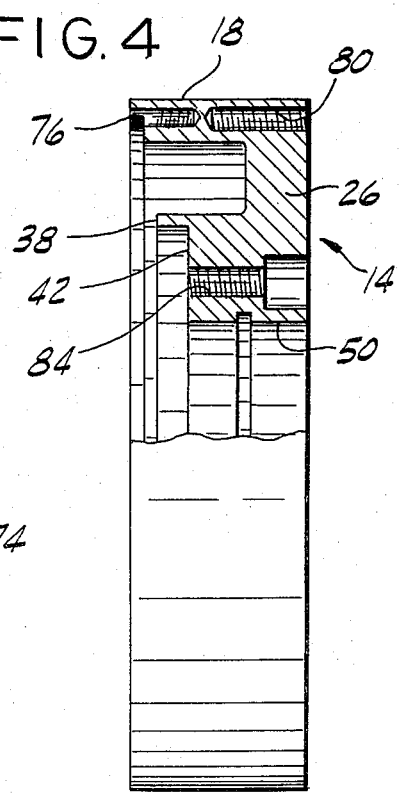
FIG. 4 is a cross-sectional view of the right stator housing portion shown in FIG. 1.
Figure 5:
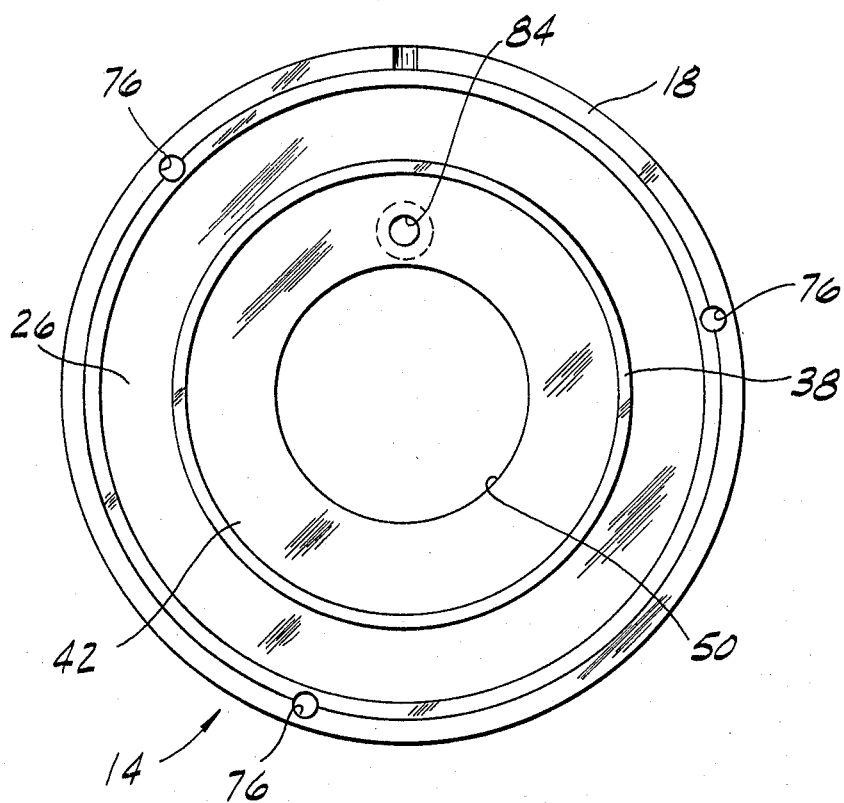
FIG. 5 is a right end view of the stator housing portion of FIG. 4.

Referring to the drawings more particularly by reference numbers, the number 10 in FIG. 1 refers to a magnetic particle device shown as a disc type magnetic particle brake constructed in accordance with the present invention. The device 10 includes a housing or stator 12 formed by two connected annular portions or halves 14 and 16. Each of the stator portions 14 and 16 is defined by a respective outer portion 18 and 20, an inner portion 22 and 24, and a portion 26 and 28 integrally connected therebetween. The portions 26 and 28 are narrower axially than the respective portions 18 and 20 and 22 and 24 on opposite sides thereof to define an annular cavity 30 therebetween when assembled. The annular cavity 30 is constructed to receive an annular coil 32 which is connected to be used to excite the device as will be explained. The coil 32 is connected by leads 34 and 36 to a suitable source of excitation current.

The housing 14 also has a sidewardly extending annular flange 38 which is important to the present invention, and the housing member 16 has an annular ledge or shoulder 40 at least a portion of which is tapered axially and cooperates with the annular flange 38 when the housing members 14 and 16 are brought together during assembly to form a seal therebetween. The housing members 14 and 16 also have other respective opposed surfaces 42 and 44 located, inwardly of the annular flange 38 which define another annular chamber 46 in which a rotatable disc member 48 is positioned.

The housing members 14 and 16 also have respective inner cylindrical surfaces 50 and 52 which respectively receive annular back up rings 54 and 56, and the races of antifriction bearing assemblies 58 and 60. The bearing assemblies 58 and 60 are locked on one side in axial position in the respective bores 50 and 52 by means of annular locking rings 62 and 64 which are positioned extending into suitable grooves formed in the respective housing members 14 and 16. The inner races of the journal assemblies 58 and 60 are mounted in spaced locations on a shaft member 66, and are prevented from axial movement thereon by means of other annular locking members or rings 68 and 70 located in suitable grooves formed therefor in the shaft 66. The rotatable disc member 48 is fixedly attached to the shaft 66 and suitable packing means such as packing means 70 and 72 are located in grooves formed in the back up rings 54 and 56 as shown in FIG. 1.

The outer flange portions 18 and 20 of the housing members 14 and 16 are bored and tapped at spaced locations as at 74 and 76, respectively, to receive threaded housing connector members such as the bolt 78. A plurality of such bolts 78 and associated bores are provided to connect the housing portions 14 and 16 together. During assembly of the subject device the two housing portions 14 and 16 are located as described and shown with the annular flange 38 abutting the tapered shoulder 40. Thereafter, as the housing members are drawn together by tightening the bolts 78, the annular flange 38 will to some extent be cammed radially outwardly by engagement with the shoulder 40 to form a seal and magnetic connection therebetween.

Other threaded bores such as threaded bores 80 and 82 shown in FIG. 1 are also provided in the housing 12 for attaching the housing 12 to a suitable support structure as required. In addition, still further threaded bore 84 is provided in the housing member 14 to communicate the annular space 46 formed between the surfaces 42 and 44 and inwardly to the annular flange 38 with the outside of the device. The bore 84 is used for filling the space 46 to the desired extent with the magnetic particles which are used to provide a path for the coupling force between the housing structure 12 and the disc 48 during operation of the device. After the desired amount of particles, which may be introduced as a dry powder or in a liquid carrier, are inserted into the space 46, bolt 86 is installed in the threaded bore 84 to prevent the magnetic particles from escaping.

During operation of the present device, the shaft 66 will be connected to a member such as a driving or driven member, and the present device will be used to provide controlled braking force to the device for some reason such as to maintain a constant load on the member being braked. Such controlled braking force has many possible uses including for example, maintaining constant tension on a web or strand of material as it is moved over, around and between feed rolls, and for other reasons as well. Since the shaft 66 and the disc 48 rotate at the same speed, the magnetic force produced by energizing the coil 32 will establish a field which will extend through the housing sections 14 and 16, across the space 46, through the magnetic particles, and through the rotating disc 48 therein. The stronger the applied field the greater will be the coupling force between the housing 12 and the disc 48, and hence the greater the braking force. The braking force can therefore be controlled by controlling the current flow through the winding 32.

It is of special importance to the present device that the annular flange 38 be constructed of magnetizable material such as from the same material as the housing members 14 and 16, so as to form a relatively narrow magnetic shorting bridge across the space between the housing members 14 and 16 on opposite sides of the disc 48. The magnetic bridge provided by the flange 38 saturates at relatively low applied current in the coil 32 and after being saturated, any additional current applied to the coil 32 will produce magnetic coupling force through the magnetic particles in the space 46 between the housing 12 and through the disc 48. Furthermore, when the current to the coil 32 is substantially reduced or removed, the residual magnetism that remains in the housing structure 12 will be shunted through the flange 38 without producing any substantial braking force on the disc 48. This is an important feature and one which enables the present device to accurately control the amount of applied braking force and yet prevents even minor braking force or drag when the control current is turned off.

It is also important to the present device that the annular flange 38 make good sealed contact with the tapered housing shoulder 40 for the reason that this contact not only establishes a saturable magnetic bridge between the housing portions but it also provides a seal between the chambers 46 and 36 to prevent the escape of the magnetic particles. Thus it is apparent that the subject construction is of relatively simple construction and yet provides important advantages not obtainable in any known construction.

Figure 6:
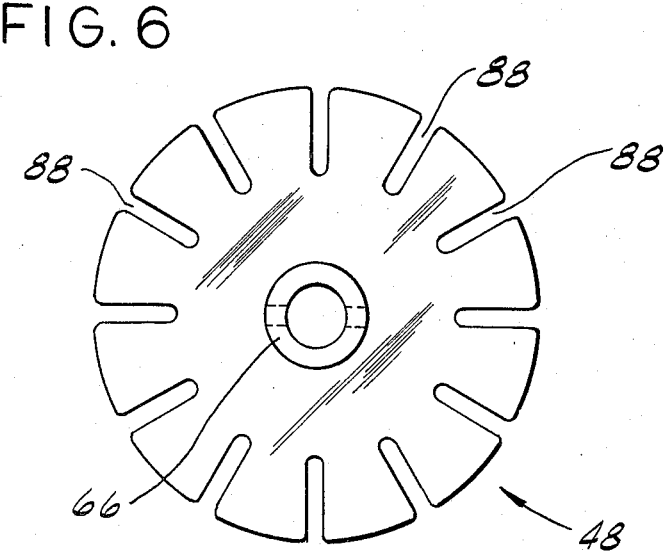
FIG. 6 is an end elevational view of the disc member per se employed in the present construction.

FIG. 6 shows a side view of a typical disc member 48 for use with the present device. The disc 48 is shown as being round and as having a plurality of circumferentially spaced notches 88 formed therein. The notches 88 provide spaced in which the magnetic particles can accumulate during filling of the device and at times when the excitation coil 32 is de-energized. The notches also enable better and more uniform distribution of the magnetic particles which is an advantage to help maintain relatively uniform coupling during operation. The shape, size and depth of the notches 88 can be varied as desired and it is also contemplated to use spaced openings instead of notches although notches have some advantages in ease of construction and ability to accumulate particles. When the disc 48 is rotating without coil energization, the magnetic particles will tend to accumulate in the notches 88. However, when the coil 32 is energized, the magnetic lines of flux that are established will cause more of the particles to move out of the notches 88 into the spaces between the sides of the disc 48 and the adjacent cavity walls 42 and 44 to enhance the coupling and increase the braking action.

Thus there has been shown and described an improved magnetic particle device which fulfills all of the objects and advantages sought therefor. It will be apparent to those skilled in the art, however, that many changes, variations, modifications and other uses and applications for the subject device are possible, and all such changes, variations, modifications and other uses and applications which do not depart from the spirit and scope of the invention are deemed to be covered by the invention which is limited only by the claims which follow.

What is claimed is:

1. A housing for a magnetic particle device comprising first and second housing members adapted to be assembled in side-by-side axial relation, at least one of said housing members having an annular cavity formed extending inwardly on the side thereof adjacent to the other housing member, an annular tapered surface formed on the side of one of said housing members at an intermediate location radially of the annular cavity, a sidewardly extending annular flange formed on the other housing member for engaging the annular tapered surface at an intermediate location thereon to divide the annular cavity into inner and outer cavity portions separated by the annular flange, and means connecting the first and second housing members including means to force the annular flange to move axially against and be deformed by engagement with the annular tapered surface to form a seal between the cavity portions.

2. The housing defined in claim 1 including a coil mounted in the outer cavity portion and a disc mounted in the inner cavity portion, and means on said housing to support the disc for rotation in the inner cavity portion.

3. The housing defined in claim 1 wherein the first and second housing members each has an inner and an outer cavity portion formed therein, the inner cavity portions on said first and second housing members cooperating to form the inner cavity on one side of the annular flange and the outer cavity portions cooperating to form the outer cavity on the other side of the annular flange.

4. The housing defined in claim 2 including magnetic particles in said inner cavity portion, said disc having a plurality of openings formed therein for holding some of said magnetic particles.

5. The housing defined in claim 4 wherein the disc has a periphery, said plurality of openings in the disc including a plurality of circumferentially spaced notches extending inwardly from the periphery thereof.

6. The housing defined in claim 1 wherein the radial thickness of said annular flange is relatively small compared to the radial dimension of the cavity portions on opposite sides thereof.

7. A magnetic particle device including a housing comprising first and second housing members adapted to be assembled in side-by-side axial relation, at least one of said housing members having an annular cavity formed extending inwardly on the side thereof adjacent to the other housing member, an annular tapered surface formed on the side of one of said housing members at an intermediate location radially of the annular cavity, a sidewardly extending annular flange formed on the other housing member in position to engage the annular tapered surface at an intermediate location thereon to divide the annular cavity radially into inner and outer cavity portions separated by the annular flange, means connecting the first and second housing members including means to force the annular flange to move axially against and be deformed by engagement with the annular tapered surface to form a seal between cavity portions, a coil positioned in the outer cavity portion, a disc member having a portion extending into the inner cavity portion, a shaft journalled in said housing members and supporting said disc for rotation in the inner cavity portion, magnetic particles in said inner cavity portion, and means sealing between the shaft and the housing members to prevent the magnetic particles from escaping from the inner cavity portion.

8. The magnetic particle device defined in claim 7 wherein said disc member has a plurality of spaced openings formed therein for holding some of said magnetic particles.

9. The magnetic particle device defined in claim 8 wherein said disc member has a periphery, said plurality of openings in the disc including a plurality of circumferentially spaced notches extending inwardly from the periphery thereof.

10. The magnetic particle device defined in claim 7 wherein said sealing means includes spaced annular sealing members on said shaft.

11. The magnetic particle device defined in claim 7 including means for connecting the coil to a source of excitation potential whereby said coil when excited establishes a magnetic field a portion of whose flux passes through said annular flange and between housing members.

12. The magnetic particle device defined in claim 11 wherein said annular flange is magnetically saturated at a relatively low coil excitation so that increased coil excitation produces said magnetic flux through the magnetic particles in the inner cavity portion and through the disc therein.

13. A magnetic particle device comprising first and second housing members adapted to be assembled in side-by-side axially aligned relation, at least one of said housing members having an annular cavity formed extending inwardly on the side thereof adjacent to the other housing member, an annular tapered surface formed on the side of one of said housing members at an intermediate location radially of the annular cavity, a sidewardly extending annular flange formed on the other housing member for engaging the annular tapered surface at an intermediate location thereon to divide the annular cavity into inner and outer cavity portions separated by the annular flange, means connecting the first and second housing members including means to force the annular flange to move axially against and be deformed by engagement with the annular tapered surface to form a seal between the cavity portions, and an electric coil in said outer cavity portion for establishing a magnetic field a portion of whose flux passes through said annular flange.

* * * * *

UNITED STATES PATENT OFFICE
CERTIFICATE OF CORRECTION

Patent No. 4,350,913            Dated September 21, 1982

Inventor(s) Gerald R. Eddens

It is certified that error appears in the above-identified patent and that said Letters Patent are hereby corrected as shown below:

column 2, line 15, "in" (second occurrence) should be --is--.

column 5, line 17, "spaced" should be --spaces--.

Signed and Sealed this

Sixteenth Day of November 1982

[SEAL]

Attest:

GERALD J. MOSSINGHOFF

Attesting Officer      Commissioner of Patents and Trademarks